(12) United States Patent
Hays et al.

(10) Patent No.: US 8,124,713 B2
(45) Date of Patent: *Feb. 28, 2012

(54) SILICONE POLYOXAMIDE AND SILICONE POLYOXAMIDE-HYDRAZIDE COPOLYMERS

(75) Inventors: David S. Hays, Woodbury, MN (US); Richard G. Hansen, Mahtomedi, MN (US); Stephen A. Johnson, Woodbury, MN (US); Benjamin J. Bending, Madison, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

This patent is subject to a terminal disclaimer.

(21) Appl. No.: 12/563,258

(22) Filed: Sep. 21, 2009

(65) Prior Publication Data

US 2011/0071268 A1    Mar. 24, 2011

(51) Int. Cl.
*C08G 77/04* (2006.01)

(52) U.S. Cl. ............... 528/26; 528/28; 528/33

(58) Field of Classification Search ............ 528/26
See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 3,890,269 A | 6/1975 | Martin | |
| 4,661,577 A | 4/1987 | Jo Lane et al. | |
| 4,935,484 A | 6/1990 | Wolfgruber et al. | |
| 5,026,890 A | 6/1991 | Webb et al. | |
| 5,082,706 A | 1/1992 | Tangney | |
| 5,214,119 A | 5/1993 | Leir et al. | |
| 5,248,739 A | 9/1993 | Schmidt et al. | |
| 5,276,122 A | 1/1994 | Aoki et al. | |
| 5,302,685 A | 4/1994 | Tsumura et al. | |
| 5,319,040 A | 6/1994 | Wengrovius et al. | |
| 5,461,134 A | 10/1995 | Leir et al. | |
| 5,512,650 A | 4/1996 | Leir et al. | |
| 5,670,598 A | 9/1997 | Leir et al. | |
| 6,355,759 B1 | 3/2002 | Sherman et al. | |
| 6,531,620 B2 | 3/2003 | Brader et al. | |
| 7,371,464 B2 | 5/2008 | Sherman et al. | |
| 7,501,184 B2 | 3/2009 | Leir et al. | |
| 2003/0175510 A1 | 9/2003 | Sherman et al. | |
| 2006/0147807 A1 | 7/2006 | Kim et al. | |
| 2007/0148474 A1* | 6/2007 | Leir et al. ............ | 428/447 |
| 2007/0148475 A1* | 6/2007 | Sherman et al. ........ | 428/447 |
| 2007/0177272 A1 | 8/2007 | Benson et al. | |
| 2009/0099291 A1 | 4/2009 | Jia et al. | |
| 2011/0071270 A1* | 3/2011 | Hays et al. .......... | 528/33 |

FOREIGN PATENT DOCUMENTS

WO    WO 2007/075317 A1    7/2007

OTHER PUBLICATIONS

"Silicones", *Encyclopedia of Polymer Science and Engineering*, vol. 15, John Wiley & Sons, New York (1989) pp. 265-270.
Portela-Cubillo et al., "Dioxime oxalates; new iminyl radical precursors for syntheses of N-heterocycles", *Tetrahedron*, 64, (2008), pp. 11908-11916.

* cited by examiner

*Primary Examiner* — Randy Gulakowski
*Assistant Examiner* — Lindsay Nelson
(74) *Attorney, Agent, or Firm* — Lisa P. Fulton; James A. Baker

(57) ABSTRACT

A copolymer comprises at least two repeating units of formula I

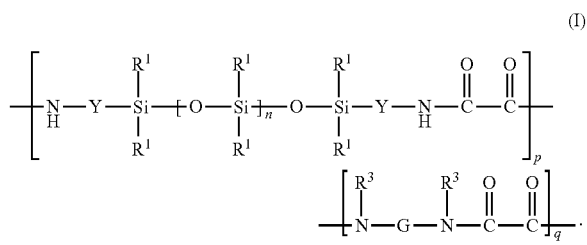

In this formula each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN$-G-$NHR^3$ minus the two —$NHR^3$ groups; each $R^3$ is independently hydrogen or alkyl or $R^3$ taken together with G and to the nitrogen to which they are both attached form a heterocyclic group; each n is independently an integer of 0 to 1500; each p is independently an integer of 1 to 10; and each q is independently an integer of 1 or greater, and wherein at least 50% of the q's are the integer 2.

21 Claims, No Drawings

SILICONE POLYOXAMIDE AND SILICONE POLYOXAMIDE-HYDRAZIDE COPOLYMERS

FIELD

This invention relates to silicone polyoxamide and silicone polyoxamide-hydrazide copolymers and to methods of making the copolymers.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides, polydiorganosiloxane polyureas, and polydiorganosiloxane polyoxamide copolymers are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyureas are another type of block copolymer. Although these block copolymers have many desirable characteristics, some of them tend to degrade when subjected to elevated temperatures such as 250° C. or higher.

Polydiorganosiloxane polyoxamides such as those disclosed in U.S. Pat. No. 7,501,184 (Leir et al.) are yet another type of block copolymer. Known polydiorganosiloxane polyoxamide copolymers have been made by mixing a diamine such as ethylene diamine with a precursor that includes at least one polydiorganosiloxane segment and at least two oxalylamino groups. The resulting copolymers have alternating soft polydiorganosiloxane segments (S) and hard oxamide segments (H) (i.e., the copolymers are of a $(S-H)_n$ type). These polydiorganosiloxane polyoxamide copolymers thus contain a relatively large fraction of the polydiorganosiloxane segment compared to many known polydiorganosiloxane polyamide copolymers. Such polydiorganosiloxane polyoxamide copolymers can usually be subjected to elevated temperatures up to 250° C. or higher without apparent degradation.

SUMMARY

In view of the foregoing, we recognize that although the alternating soft and hard segment polydiorganosiloxane polyamide copolymers described above are an improvement over less thermally stable thermoplastic silicone elastomers, it would be advantageous to have the ability to control the level and distribution of hard segments within the copolymer chain.

Briefly, in one aspect, the present invention provides silicone polyoxamide and silicone polyoxamide-hydrazide copolymers comprising at least two repeating units of formula I:

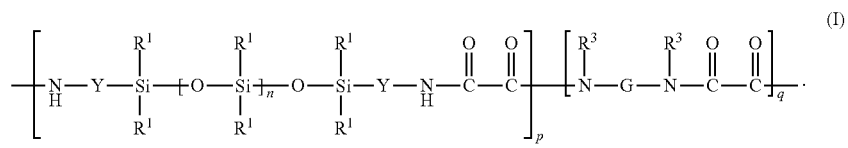

In this formula, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN\text{-}G\text{-}NHR^3$ minus the two $-NHR^3$ groups; each $R^3$ is independently hydrogen or alkyl or $R^3$ taken together with G and to the nitrogen to which they are both attached form a heterocyclic group; each n is independently an integer of 0 to 1500; each p is independently an integer of 1 to 10; and each q is independently an integer of 1 or greater. At least 50% of the q's are the integer 2.

The silicone polyoxamide and silicone polyoxamide-hydrazide copolymers of the invention can have "runs" of hard segments and need not have perfectly alternating soft and hard segments. Properties such as solvent resistance, modulus, hardness, melt rheology, shear, and/or adhesion can be improved by the incorporation of extra hard segments runs in the copolymers.

In another aspect, the present invention provides a method of making a copolymeric material comprising at least two repeat units of formula I':

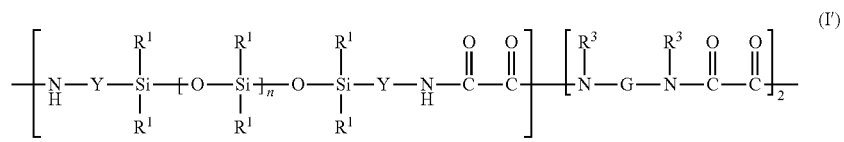

wherein $R^1$, Y, G, $R^3$ and n are defined as above.

The method comprises (a) reacting a compound of formula IV

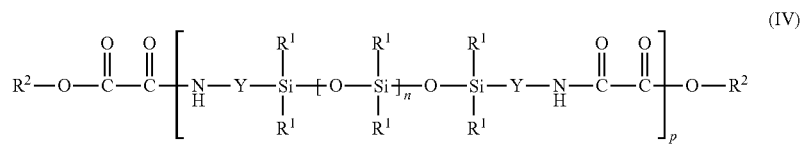

wherein p is an integer of 1 to 10 and each $R^2$ is independently an alkyl, haloalkyl, aryl, or

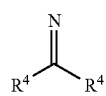

aryl substituted with an alkyl, alkoxy, halo, alkoxycarbonyl, or bound through the N, wherein each $R^4$ is independently hydrogen, alkyl, or aryl or $R^4$ taken together with form a ring, with a molar excess of a diamine of formula V

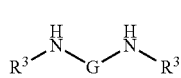

to form an amine-terminated polymer of formula VI (b) removing excess diamine; and (c) treating the amine-terminated polymer of formula VI with an oxalate ester of formula II to form the repeat unit of formula I'

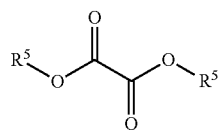

wherein $R^5$ is an alkyl, haloalkyl, aryl, or aryl substituted with an alkyl, alkoxy, halo, or alkyoxycarbonyl, or

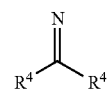

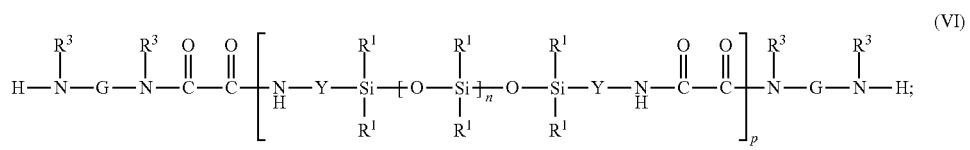

bound through the N, wherein each $R^4$ is independently hydrogen, alkyl, or aryl or $R^4$ taken together form a ring.

Previously known methods of making polydiorganosiloxane polyoxamide copolymers such as the method disclosed in U.S. Patent Application Pub. No. 2007/0148474 (Leir et al.) result in only $(S—H)_n$ type copolymers. The method of the invention, however, can be used to make copolymers having runs of hard segments.

DETAILED DESCRIPTION

The silicone polyoxamide and silicone polyoxamide-hydrazide copolymers of the invention comprise at least two repeating units of formula I:

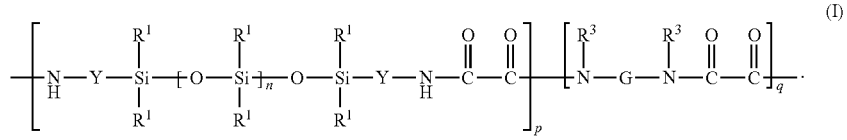

In this formula, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN$-G-$NHR^3$ minus the two —$NHR^3$ groups; each $R^3$ is independently hydrogen or alkyl or $R^3$ taken together with G and to the nitrogen to which they are both attached form a heterocyclic group; each n is independently an integer of 0 to 1500; each p is independently an integer of 1 to 10; and each q is independently an integer of 1 or greater. At least 50% of the q's are the integer 2.

Suitable alkyl groups for $R^1$ in formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of formula I, at least 40 percent, and preferably at least 50 percent, of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each G in formula I is independently a bond or a residual unit that is equal to a diamine compound of formula $R^3HN$-G-$NHR^3$ minus the two amino groups (i.e., —$NHR^3$ groups). When G is a bond, the copolymer is a silicone polyoxamide-hydrazide. In some embodiments, G is a bond and each $R^3$ is hydrogen.

When G is a residual unit, the copolymer is a silicone polyoxamide. The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N$-G-$NH_2$.

In some embodiments, G is an alkylene, heteroalkylene, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylenearylene-alkylene combination, the arylene is phenylene and each alkylene has 1 to 10, 1 to 6, or 1 to 4 carbon atoms.

Each subscript n in formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

Each subscript p is independently an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Each subscript q is independently an integer of 1 or greater and at least 50% of the q's are the integer 2. In some embodiments, at last 75%, at least 90%, at least 99%, or even all of the q's are the integer 2.

The copolymers of the invention tend to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is not bonded to another carbonyl group and is part of an oxalyl group. More specifically, the copolymers of the invention have a plurality of aminoxalylamino groups.

The silicone polyoxamide and silicone polyoxamide-hydrazide copolymers of the invention are linear block copolymers (i.e., they comprise hard blocks and soft blocks) and can be elastomeric. They tend to have better solvent resistance than previously known polydiorganosiloxane polyoxamides. Some of the copolymers of the invention are insoluble, for example, in toluene or even in tetrahydrofuran. For the purposes of this invention, the following method shall determine whether a copolymer is "insoluble" in a particular solvent. About 1 g of sample copolymer is placed in jar, approximately 100 g of the desired solvent is added, and the jar is sealed and placed on a roller at ambient temperature for approximately 4 hours. A copolymer sample is considered to be insoluble if, after drying to constant weight, ≧90% of the original mass is retained.

The copolymers of the invention also tend to have improved heat stability. Some of the copolymers of the invention, for example, do not flow at or below about 220° C., at or below about 260° C., or even at or below about 300° C. For the purposes of this invention, the temperature at which a copolymer flows is defined as the temperature at which the copolymer is sufficiently soft such that it compresses to a thickness of 2 mm in an ARES parallel plate rheometer (available from TA Instruments, New Castle, Del.).

The copolymers of the invention can be optically clear. As used herein, the term "optically clear" refers to a material that is clear to the human eye. An optically clear copolymeric material often has a luminous transmission of at least 90 percent, a haze of less than 2 percent, and opacity of less than 1 percent in the 400 to 700 nm wavelength range. Both the luminous transmission and the haze can be determined using, for example, the method of ASTM-D 1003-95.

Additionally, the copolymers can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of 1.41 to 1.50.

Functional components, tackifiers, plasticizers, and other property modifiers may be incorporated in the copolymer of the invention. Preferred optional additives are not hot melt processable. That is, they do not melt and flow at the temperatures at which the copolymer of the invention melts and flows.

Functional components include, for example, antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, fumed silica, glass beads, glass bubbles, glass fibers, mineral fibers, clay particles, organic fibers, e.g., nylon, KEVLAR, metal particles, and the like. Such optional additives can be added in amounts up to 100 parts per 100 parts of the copolymer of the invention, provided that if and when incorporated, such additives are not detrimental to the function and functionality of the final polymer product. Other additives such as light diffusing materials, light absorptive materials and optical brighteners, flame retardants, stabilizers, antioxidants, compatibilizers, antimicrobial agents such as zinc oxide, electrical conductors, thermal conductors such as aluminum oxide, boron nitride, aluminum nitride, and nickel particles, including organic and/or inorganic particles, or any number or combination thereof, can be blended into these systems. The functional components listed above may also be incorporated into copolymer of the invention provided such incorporation does not adversely affect the resulting product to an undesirable extent.

Tackifying materials or plasticizers useful with the polymeric materials are preferably miscible at the molecular level, e.g., soluble in, any or all of the polymeric segments of the elastomeric material or the thermoplastic elastomeric material. When the tackifying material is present it generally comprises 5 to 300 parts by weight, more typically up to 200 parts by weight, based on 100 parts by weight of the polymeric material. Examples of tackifiers suitable for the invention include but are not limited to silicone fluids, liquid rubbers, hydrocarbon resins, rosin, natural resins such as dimerized or hydrogenated balsams and esterified abietic acids, polyterpenes, terpene phenolics, phenol-formaldehyde resins, and rosin esters. Examples of plasticizers include but are not limited to polybutene, paraffinic oils, petrolatum, and certain phthalates with long aliphatic side chains such as ditridecyl phthalate.

Other suitable tackifiers include silicate tackifying resins. Suitable silicate tackifying resins include those resins composed of the following structural units M (i.e., monovalent $R_3SiO_{1/2}$ units), D (i.e., divalent $R_2SiO_{2/2}$ units), T (i.e., trivalent $RSiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R groups.

MQ silicate tackifying resins are copolymeric resins having $R_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("TOH" units), thereby accounting for the silicon-bonded hydroxyl content of the silicate tackifying resin, and some are bonded only to other $SiO_{4/2}$ units.

Such resins are described in, for example, Encyclopedia of Polymer Science and Engineering, vol. 15, John Wiley & Sons, New York, (1989), pp. 265-270, and U.S. Pat. Nos. 2,676,182 (Daudt et al.), 3,627,851 (Brady), 3,772,247 (Flannigan), and 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. Nos. 5,319,040 (Wengrovius et al.), 5,302,685 (Tsumura et al.), and 4,935,484 (Wolfgruber et al.).

Certain MQ silicate tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having $R_3SiO_{1/2}$ units ("M" units), $SiO_{4/2}$ units ("Q" units), and $R_2SiO_{2/2}$ units ("D" units) such as are taught in U.S. Pat. No. 2,736,721 (Dexter). In MQD silicone tackifying resins, some of the methyl R groups of the $R_2SiO_{2/2}$ units ("D" units) can be replaced with vinyl ($CH_2=CH-$) groups ("DVi" units).

MQT silicate tackifying resins are terpolymers having $R_3SiO_{1/2}$ units, $SiO_{4/2}$ units and $RSiO_{3/2}$ units ("T" units) such as are taught in U.S. Pat. No. 5,110,890 (Butler) and Japanese Kokai HE 2-36234.

Suitable silicate tackifying resins are commercially available from sources such as Dow Corning, Midland, Mich.; Momentive Performance Materials, Albany, N.Y.; and Rhodia Silicones, Rock Hill, S.C. Examples of particularly useful MQ silicate tackifying resins include those available under the trade designations SR-545 and SR-1000, both of which are commercially available from Momentive Performance Materials, Albany, N.Y. Such resins are generally supplied in organic solvent and may be employed in the formulations of the adhesives of the present invention as received. Blends of two or more silicate resins can be included in the adhesive compositions.

The copolymers of the invention can be cast from solvents or cast and polymerized as film, molded or embossed in various shapes, or extruded into films. The high temperature stability of the copolymeric material makes them well suited for extrusion methods of film formation. The films can be optically clear. A multilayer film containing polydiorganosiloxane polyoxamide block copolymers is described, for example, in U.S. Pat. No. 7,820,297 (Benson et al.).

The copolymers of the invention are useful in various articles. The articles, for example, can include a layer containing the copolymer of the invention and one or more optional substrates. For example, the copolymer of the invention can be in a layer adjacent to a first substrate or positioned between a first substrate and a second substrate. That is, the article can be arranged in the following order: a first substrate, a layer containing the copolymer of the invention, and a second substrate. As used herein, the term "adjacent" refers to a first layer that contacts a second layer or that is positioned in proximity to the second layer but separated from the second layer by one or more additional layers.

The copolymers of the invention can be formulated into adhesive compositions such as pressure sensitive adhesives and heat activated adhesives that contain a tackifier. Such adhesive compositions are further described, for example, in U.S. Pat. No. 7,371,464 (Sherman et al.).

Additionally, the copolymers of the invention can be used as a hot melt adhesive. Typically, the hot melt adhesive contains little or no tackifier. The hot melt adhesives can be used, for example, to bond two surfaces together into a composite. That is, the hot melt adhesive can be used to bond a first substrate to a second substrate with the hot melt adhesive positioned between the first and second substrates. During application to a surface such as the surface of a substrate, hot melt adhesives are desirably sufficiently fluid to wet the surface completely and leave no voids, even if the surface is rough. Such an adhesive composition typically has a low viscosity at the time of application and then sets into a solid upon cooling. The cohesive strength develops upon cooling. Alternatively, the hot melt adhesive composition can be formulated with a solvent or carrier that lowers the viscosity sufficiently to permit wetting of the surface. The solvent or carrier can then be removed to provide a solid coating having cohesive strength.

The copolymers of the invention are also useful as low adhesion backsize coatings.

Silicone polyoxamide and silicone polyoxamide-hydrazide copolymers of the invention can be prepared according the method of the invention. The following method can be used to make a copolymeric material comprising at least two repeat units of formula I':

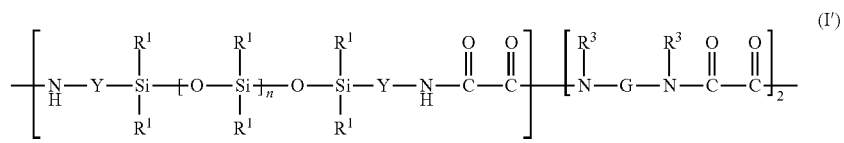

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula R³HN-G-NHR³ minus the two —NHR³ groups; each R³ is independently hydrogen or alkyl or R³ taken together with G and with the nitrogen to which they are both attached form a heterocyclic group; and each n is independently an integer of 0 to 1500.

Suitable examples of $R^1$, Y, G, and $R^3$ are the same as described above for formula I.

The first step of the method of the invention involves the use of a compound of formula IV

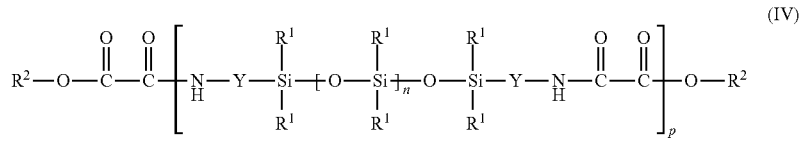

wherein p is an integer of 1 to 10.

The compound of formula IV has at least one polydiorganosiloxane segment and at least two oxalylamino groups. Group $R^1$, group Y, and subscript n are the same as described for formula I', and p is an integer of 1 to 10. Each group $R^2$ is independently an alkyl, haloalkyl, aryl, or aryl substituted with an alkyl, alkoxy, halo, alkoxycarbonyl, or

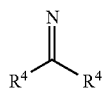

bound through the N, wherein each $R^4$ is independently hydrogen, alkyl, or aryl or $R^4$ taken together form a ring.

Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2, 2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The compound of formula IV can include a single compound (i.e., all the compounds have the same value of p and n) or can include a plurality of compounds (i.e., the compounds have different values for p, different values for n, or different values for both p and n). Compounds with different n values have siloxane chains of different length. Compounds having a p value of at least 2 are chain extended.

In some embodiments, there is a mixture of a first compound of formula IV with subscript p equal to 1 and a second compound of formula IV with subscript p equal to at least 2. The first compound can include a plurality of different compounds with different values of n. The second compound can include a plurality of compounds with different values of p, different values of n, or different values of both p and n. Mixtures can include at least 50 weight percent of the first compound of formula IV (i.e., p is equal to 1) and no greater than 50 weight percent of the second compound of formula IV (i.e., p is equal to at least 2) based on the sum of the weight of the first and second compounds in the mixture. In some mixtures, the first compound is present in an amount of at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, or at least 98 weight percent based on the total amount of the compounds of formula IV. The mixtures often contain no greater than 50 weight percent, no greater than 45 weight percent, no greater than 40 weight percent, no greater than 35 weight percent, no greater than 30 weight percent, no greater than 25 weight percent, no greater than 20 weight percent, no greater than 15 weight percent, no greater than 10 weight percent, no greater than 5 weight percent, or no greater than 2 weight percent of the second compound.

Different amounts of the chain-extended compound of formula IV in the mixture can affect the final properties of the elastomeric material of formula I'. That is, the amount of the second compound of formula IV (i.e., p equal to at least 2) can be varied advantageously to provide elastomeric materials with a range of properties. For example, a higher amount of the second compound of formula IV can alter the melt rheology (e.g., the elastomeric material can flow easier when present as a melt), alter the softness of the elastomeric material, lower the modulus of the elastomeric material, or a combination thereof.

In the first step of the method of the invention, a compound of formula IV is combined under reaction conditions with a molar excess of a diamine of formula V

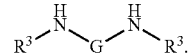

Group $R^3$ and group G are the same as described for formula I'.

The diamines of formula V are sometimes classified as organic diamines or polydiorganosiloxane diamines with the organic diamines including, for example, those selected from alkylene diamines, heteroalkylene diamines, arylene diamines, aralkylene diamines, or alkylene-aralkylene diamines. The diamine has only two amino groups so that the resulting polydiorganosiloxane polyoxamides and polyoxamide-hydrazides are linear block copolymers that are often elastomeric, molten at elevated temperatures, and soluble in some common organic solvents. The diamine is free of a polyamine having more than two primary or secondary amino groups. Tertiary amines that do not react with the compound of formula IV can be present.

Exemplary polyoxyalkylene diamines (i.e., G is a heteroalkylene with the heteroatom being oxygen) include, but are not limited to, those commercially available from Huntsman, The Woodlands, Tex. under the trade designation JEFFAMINE D-230 (i.e., polyoxypropylene diamine having an average molecular weight of 230 g/mole), JEFFAMINE D-400 (i.e., polyoxypropylene diamine having an average molecular weight of 400 g/mole), JEFFAMINE D-2000 (i.e., polyoxypropylene diamine having an average molecular weight of 2,000 g/mole), JEFFAMINE HK-511 (i.e., polyetherdiamine with both oxyethylene and oxypropylene groups and having an average molecular weight of 220 g/mole), JEFFAMINE ED-2003 (i.e., polypropylene oxide capped polyethylene glycol having an average molecular weight of 2,000 g/mole), and JEFFAMINE EDR-148 (i.e., triethyleneglycol diamine).

Exemplary alkylene diamines (i.e., G is a alkylene) include, but are not limited to, ethylene diamine, propylene diamine, butylene diamine, hexamethylene diamine, 2-methylpentamethylene 1,5-diamine (i.e., commercially available from DuPont, Wilmington, Del. under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

Exemplary hydrazines (i.e., G is a bond) include, but are not limited to, hydrazine and N,N'-diaminopiperazine.

In some preferred embodiments, the diamine of formula V is selected from the group consisting of hydrazine, 1,2-diaminoethane, 1,3-diaminopropane, 1,4-diaminobutane, 1,5-diaminopentane, 2-methyl-1,5-pentanediamine, 1,6-diaminohexane, and m-xylylenediamine.

From the reaction of a compound of formula IV and a molar excess of diamine of formula V, an amine-terminated polymer of formula VI is obtained polydiorganosiloxane diamine. Likewise, a single compound of formula IV can be combined under reaction conditions with multiple diamines.

The condensation reaction of the compound of formula IV with the diamine is often conducted at room temperature or at elevated temperatures such as at temperatures up to 250° C. For example, the reaction often can be conducted at room temperature or at temperatures up to 100° C. In other examples, the reaction can be conducted at a temperature of at least 100° C., at least 120° C., or at least 150° C. For example, the reaction temperature is often in the range of 100° C. to 220° C., in the range of 120° C. to 220° C., or in the range of 150° C. to 200° C. The condensation reaction is often complete in less than 1 hour, in less than 2 hours, in less than 4 hours, in less than 8 hours, or in less than 12 hours.

The reaction can occur in the presence or absence of a solvent. Suitable solvents usually do not react with any of the reactants or products of the reactions. Additionally, suitable solvents are usually capable of maintaining all the reactants and all of the products in solution throughout the process. Exemplary solvents include, but are not limited to, toluene, tetrahydrofuran, dichloromethane, aliphatic hydrocarbons (e.g., alkanes such as hexane), or mixtures thereof.

After the reaction is complete, excess diamine and solvent, if present, is removed. The excess diamine can be removed, for example, by vacuum distillation.

The resulting amine-terminated polymer of formula VI is then treated with an oxalate ester to consume the amine end groups and form the repeat unit of formula I'. Useful oxalate esters are of formula II

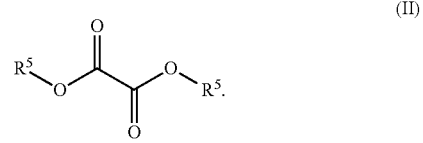

(II)

The oxalates of formula II can be prepared, for example, by reaction of an alcohol of formula $R^5$—OH with oxalyl dichloride. Commercially available oxalates of formula II (e.g., from Sigma-Aldrich, Milwaukee, Wis. and from VWR International, Bristol, Conn.) include, but are not limited to, dimethyl oxalate, diethyl oxalate, di-n-butyl oxalate, di-tert-butyl oxalate, bis(phenyl)oxalate, bis(pentafluorophenyl) oxalate, 1-(2,6-difluorophenyl)-2-(2,3,4,5,6-pentachlorophenyl) oxalate, and bis(2,4,6-trichlorophenyl) oxalate.

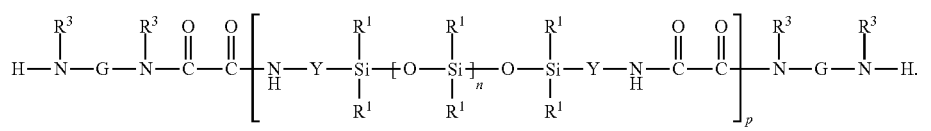

(VI)

The reaction can be conducted using a plurality of compounds of formula IV, a plurality of diamines, or a combination thereof. A plurality of compounds of formula IV having different average molecular weights can be combined under reaction conditions with a single diamine or with multiple diamines. For example, the compound of formula IV may include a mixture of materials with different values of n, different values of p, or different values of both n and p. The multiple diamines can include, for example, a first diamine that is an organic diamine and a second diamine that is a Particularly useful oxalate esters of formula II include, for example, oxalate esters of phenol, ethanol, butanol, methyl ethyl ketone oxime, acetone oxime, and trifluoroethanol.

Any suitable reactor (e.g., a glass vessel or a standard kettle equipped with agitators) or process can be used to prepare the copolymeric material according to the method of the invention. The reaction can be conducted using a batch process, semi-batch process, or a continuous process.

Any solvent that is present can be stripped from the resulting polydiorganosiloxane polyoxamide or polyoxamide-hydrazide at the completion of the reaction. The stripping process is often conducted at a temperature of at least 100° C., at least 125° C., or at least 150° C. The stripping process is typically at a temperature less than 300° C., less than 250° C., or less than 225° C.

Conducting the reaction in the absence of a solvent can be desirable. A solvent that is not compatible with both reactants and the product can result in incomplete reaction and a low degree of polymerization.

EXAMPLES

Objects and advantages of this invention are further illustrated by the following examples, but the particular materials and amounts thereof recited in these examples, as well as other conditions and details, should not be construed to unduly limit this invention. All parts, percentages, ratios, and the like in the examples and are by weight, unless noted otherwise. Solvents and other reagents used were obtained from Sigma-Aldrich Chemical Company, Milwaukee, Wis. or EMD Chemicals, Gibbstown, N.J. unless otherwise noted.

| Table of Materials | |
|---|---|
| Component | Description |
| PDMS diamine | A polydimethylsiloxane diamine of the following formula $H_2N-\!\!\!\sim\!\!\!-Si(CH_3)_2-[O-Si(CH_3)_2]_n-O-Si(CH_3)_2-\!\!\!\sim\!\!\!-NH_2$ with a number average molecular weight of about 5,000 g/mole (5k), about 14,000 g/mole (14k), or about 25,000 g/mole (25k) prepared according to U.S. Pat. No. 5,214,119. Unstripped PDMS diamine contains about 13 percent by weight of volatile cyclics as described in U.S. Pat. No. 5,026,890. |
| DYTEK A | 2-methyl-1,5-pentanediamine, Dupont, Wilmington, DE |

Test Methods

Amine equivalent weight (AEW) of PDMS diamines was determined by titration in tetrahydrofuran (THF) using standardized 1 N aqueous HCl against a bromophenol blue endpoint.

Ester equivalent weight (EEW) of formula IV samples was determined according to the method in U.S. Pat. No. 7,501,184.

Young's modulus was determined on dogbone shaped specimens about 1 mm in thickness and having a testable area of 5 mm by 20 mm using a model 1122 tensile tester from Instron Corporation, Norwood, Mass.

Complex melt viscosity of polymers of the present invention was obtained using an ARES rheometer (TA Instruments, New Castle, Del.) with a gap of 2.0 mm at 260° C. and a shear rate of 100 radians/second.

Shore A Hardness was measured according to ASTM D2240-5 Standard Test Method for Rubber Property-Durometer Hardness. This test method is based on the penetration of a specific type of indentor when forced into the material under specified conditions. The indentation hardness is inversely related to the penetration and is dependent on the elastic modulus and viscoelastic behavior of the material.

Average inherent viscosities (IV) were measured at 27° C. using a Canon-Fenske viscometer (Model No. 50 P296) in a THF solution at 27° C. at a concentration of 0.2 g/dL. The inherent viscosities were averaged over 3 or more runs. Any variations for determining average inherent viscosities are set forth in specific Examples. The values are reported in dL/g.

Preparation of Compounds of Formula IV

Compounds of formula IV were prepared from PDMS diamine and a 3-5 fold molar excess of diethyl oxalate according to Preparative Example 1 of US patent publication 2007/014874.

Preparation of the Compound of Formula VII

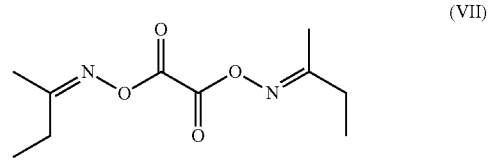

(VII)

To a 1 L flask equipped with an overhead stirrer, addition funnel, ice bath, temperature probe, and nitrogen inlet was added 2-butanone oxime (93.23 g) and MTBE (500 mL). The contents were cooled to 10° C., and oxalyl chloride (67.9 g) was added over 30 min, maintaining the internal temperature below 15° C. Triethylamine (108 g) was then added dropwise over 30 min with external cooling to maintain the internal temperature below 30° C. Enough water was added to dissolve the resulting solids, and then the aqueous layer was drawn off. The organic layer was washed twice with 0.1 N HCl and once with 2 M sodium carbonate, after which it was dried over MgSO$_4$ and filtered through a pad of CELITE. The solvent was removed on a rotary evaporator to afford 120 g of the compound of formula VII as a clear, colorless oil. $^1$H NMR (CDCl$_3$) was consistent with the proposed structure, present as a mixture of geometrical isomers.

Example 1

Preparation of Silicone Polyoxamide-Hydrazide $$\left[\!\!-\!\!\underset{H}{N}\!\!-\!\!\sim\!\!-\!\!\underset{CH_3}{\overset{CH_3}{Si}}\!\!-\!\!\left[O\!-\!\underset{CH_3}{\overset{CH_3}{Si}}\right]_n\!\!-\!\!O\!-\!\underset{CH_3}{\overset{CH_3}{Si}}\!\!-\!\!\sim\!\!-\!\!\underset{H}{N}\!\!-\!\!\underset{\|}{\overset{O}{C}}\!\!-\!\!\underset{\|}{\overset{O}{C}}\!\!-\!\!\left[\underset{H}{N}\!\!-\!\!\underset{H}{N}\!\!-\!\!\underset{\|}{\overset{O}{C}}\!\!-\!\!\underset{\|}{\overset{O}{C}}\!\!-\!\right]_2\right]_p$$

The compound of formula IV (EEW=8076 g/mol, 365 g, 45.20 mmol) was added to anhydrous hydrazine (7 mL) over 10 min with vigorous stirring under a N$_2$ atmosphere. After 3 h, the excess hydrazine was distilled out at 110° C. under vacuum (1 torr) with a subsurface N$_2$ sparge. Upon cooling, a viscous gum was obtained. $^1$H NMR confirmed the desired structure.

The resulting material (100.0 g) was dissolved in CH$_2$Cl$_2$ (200 mL), and diphenyl oxalate (1.500 g, available from TCI America, Portland Oreg.) was added. After agitating for 6 weeks at ambient temperature, the viscous solution was isolated by evaporating the solvent at room temperature for 48 hours then in a vacuum oven at 150° C. for 48 hours to obtain a clear, tough elastomer

Example 2

Preparation of Silicone Poly(oxamide)

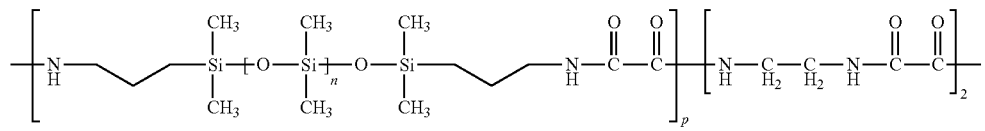

The compound of formula IV (EEW=12,887 g/mol, 400 g, 31.0 mmol) was added to ethylene diamine (9.33 g) in 70 mL of xylenes over 10 min with vigorous stirring under a $N_2$ atmosphere. After 3 hours, the excess ethylene diamine was distilled out at 120° C. under vacuum (1 torr) with a subsurface $N_2$ sparge. Upon cooling, a viscous gum was obtained. AEW was 17,974 g/mol.

The resulting material (50.0 g) was dissolved in $CH_2Cl_2$ (150 mL) and diphenyl oxalate (337 mg) was added. After agitating for 1 week at ambient temperature, the material was isolated by evaporating the solvent at room temperature for 24 hours then in a vacuum oven at 150° C. for 48 hours to obtain a clear, tough elastomer. IV was 2.53.

Example 3

Preparation of Silicone Poly(oxamide)

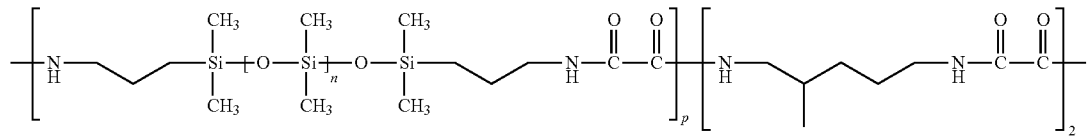

The compound of formula IV (EEW=12,887 g/mol, 400 g, 31.0 mmol) was added to DYTEK A (18.13 g) in 50 mL decalin over 10 min with vigorous stirring under a $N_2$ atmosphere. After 3 hours, the excess ethylene diamine was distilled out at 175° C. under vacuum (1 torr) with a subsurface $N_2$ sparge. Upon cooling, a viscous liquid was obtained. AEW was 16,193 g/mol.

The resulting material (50.00 g) was dissolved in $CH_2Cl_2$ (150 mL) and diphenyl oxalate (373 mg) was added. After agitating for 5 days at ambient temperature, the material was isolated by evaporating the solvent at room temperature for 24 hours then in a vacuum oven at 150° C. for 48 hours to obtain a clear, tough elastomer. IV was 2.29.

Example 4

The compound of Formula IV (EEW=3195 g/mol, 1015 g) was added to ethylene diamine (95.5 g) in 100 mL xylenes over 20 min with vigorous stirring while maintaining the internal temperature at 50° C. After 1 h, the volatiles were distilled out under vacuum (1 torr) with a subsurface Ar sparge, first at ambient temperature, then at 140° C. Upon cooling a viscous gum was obtained (AEW=3898 g/mol).

The resulting material (25.0 g) was dissolved in THF (75 mL), and the compound of formula VII (0.7319 g) was added. The mixture was agitated briefly, then immediately poured into Teflon molds, after which it solidified within 1 minute. The resulting fully dried and polymerized material had a complex melt viscosity of 1716 poise at 260° C. and 100 radians/second.

Example 5

The compound of Formula IV (EEW=3195 g/mol, 1015 g) was added to ethylene diamine (95.5 g) in 100 mL xylenes over 20 min with vigorous stirring while maintaining the internal temperature at 50° C. After 1 h, the volatiles were distilled out under vacuum (1 torr) with a subsurface Ar sparge, first at ambient temperature, then at 140° C. Upon cooling a viscous gum was obtained (AEW=3898 g/mol).

The resulting material (25.0 g) was dissolved in $CH_2Cl_2$ (75 mL), and dibutyl oxalate (0.6486 g) was added. The mixture was agitated briefly, then immediately poured into Teflon molds. The resulting fully dried and polymerized material had a Shore A hardness of 58 and a Young's modulus of 4.8 MPa. It was insoluble in toluene and THF.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A copolymer comprising at least two repeating units of formula I:

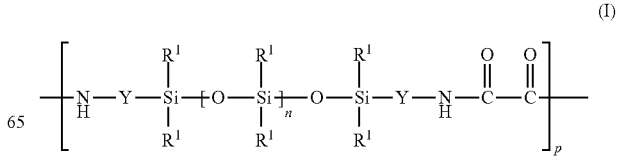

wherein:

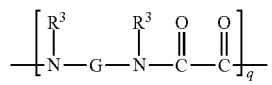

each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
each G is independently a bond or a divalent residue equal to a diamine of formula $R^3HN\text{-}G\text{-}NHR^3$ minus the two —$NHR^3$ groups;
each $R^3$ is independently hydrogen or alkyl or $R^3$ taken together with G and to the nitrogen to which they are both attached form a heterocyclic group;
each n is independently an integer of 0 to 1500;
each p is independently an integer of 1 to 10; and
each q is independently an integer of 1 or greater, and wherein at least 75% of the q's are the integer 2.

2. The copolymer of claim 1 wherein at least 90% of the q's are the integer 2.
3. The copolymer of claim 1 wherein at least 99% of the q's are the integer 2.
4. The copolymer of claim 1 wherein each q is the integer 2.
5. The copolymer of claim 1 wherein each $R^1$ is methyl.
6. The copolymer of claim 1 wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.
7. The copolymer of claim 1 wherein G is an alkylene, heteroalkylene, arylene, aralkylene, or a combination thereof.
8. The copolymer of claim 1 wherein G is a bond and each $R^3$ is hydrogen.
9. The copolymer of claim 1 wherein n is at least 40.
10. The copolymer of claim 1 wherein each $R^3$ is hydrogen.
11. The copolymer of claim 1 wherein each $R^1$ is methyl, Y is propylene, each $R^3$ is hydrogen, and G is ethylene.
12. The copolymer of claim 1 wherein the copolymer is insoluble in toluene.
13. The copolymer of claim 12 wherein the copolymer is insoluble in tetrahydrofuran.
14. The copolymer of claim 1 wherein the copolymer does not flow at or below about 220° C.
15. The copolymer of claim 14 wherein the copolymer does not flow at or below about 260° C.

16. The copolymer of claim 15 wherein the copolymer does not flow at or below about 300° C.
17. A method of making a copolymeric material comprising at least two repeat units of formula I'

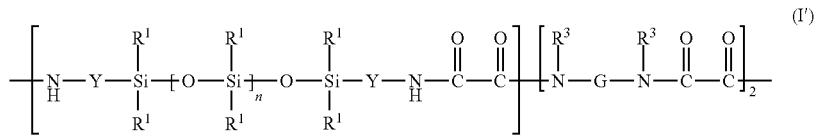

wherein:
each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
each G is independently a bond a divalent residue equal to a diamine of formula $R^3HN\text{-}G\text{-}NHR^3$ minus the two —$NHR^3$ groups;
each $R^3$ is independently hydrogen or alkyl or $R^3$ taken together with G and to the nitrogen to which they are both attached form a heterocyclic group; and
each n is independently an integer of 0 to 1500;
the method comprising:
(a) reacting a compound of formula IV

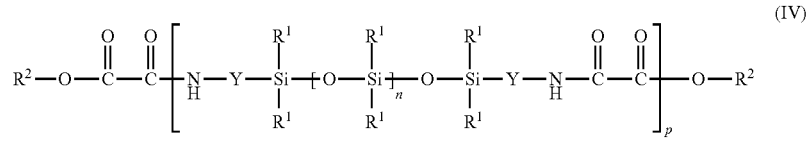

wherein p is an integer of 1 to 10, and each $R^2$ is independently an alkyl, haloalkyl, aryl, or aryl substituted with an alkyl, alkoxy, halo, alkyoxycarbonyl, or

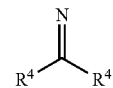

bound through the N, wherein each $R^4$ is independently hydrogen, alkyl, or aryl or $R^4$ taken together with form a ring;
with a molar excess of a diamine of formula V

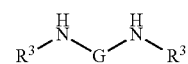

to form an amine-terminated polymer of formula VI

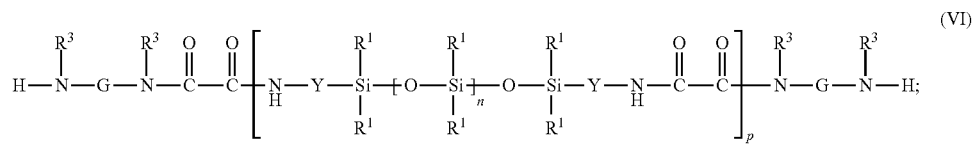

(b) removing excess diamine; and
(c) treating the amine-terminated polymer of formula VI with an oxalate ester of formula II to form the repeat unit of formula I'

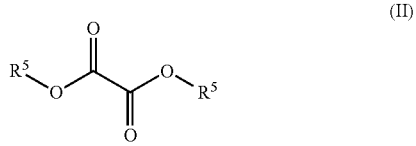

wherein:
  $R^5$ is an alkyl, haloalkyl, aryl, or aryl substituted with an alkyl, alkoxy, halo, or alkyoxycarbonyl, or

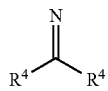

bound through the N, wherein each $R^4$ is independently hydrogen, alkyl, or aryl or $R^4$ taken together with form a ring.

18. The method of claim 17 wherein the diamine of formula V is selected from the group consisting of hydrazine, 1,2-diaminoethane, 1,3-diaminopropane, 1,4-diaminobutane, 1,5-diaminopentane, 2-methyl-1,5-pentanediamine, 1,6-diaminohexane, and m-xylylenediamine.

19. The method of claim 18 wherein the diamine of formula V is hydrazine, 1,2-diaminoethane, or 2-methyl-1,5-pentanediamine.

20. The method of claim 17 wherein the oxalate ester of formula II is an oxalate ester of phenol, ethanol, butanol, methyl ethyl ketone oxime, acetone oxime, or trifluoroethanol.

21. An article comprising the copolymer of claim 1 wherein the article is a pressure sensitive adhesive, film, mixture, or low adhesion backsize.

* * * * *

UNITED STATES PATENT AND TRADEMARK OFFICE
CERTIFICATE OF CORRECTION

| | |
|---|---|
| PATENT NO. | : 8,124,713 B2 |
| APPLICATION NO. | : 12/563258 |
| DATED | : February 28, 2012 |
| INVENTOR(S) | : David S. Hays |

It is certified that error appears in the above-identified patent and that said Letters Patent is hereby corrected as shown below:

Column 3
Lines 29-43, delete "wherein p is an integer of 1 to 10 and each $R^2$ is independently an alkyl, haloalkyl, aryl, or

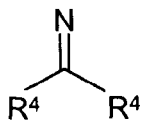

aryl substituted with an alkyl, alkoxy, halo, alkyoxycarbonyl, or bound through the N, wherein each $R^4$ is independently hydrogen, alkyl, or aryl or $R^4$ taken together with form a ring,"
and insert --wherein p is an integer of 1 to 10 and each $R^2$ is independently an alkyl, haloalkyl, aryl, or aryl substituted with an alkyl, alkoxy, halo, alkoxycarbonyl, or

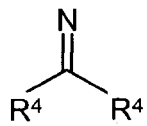 bound through the N, wherein each $R^4$ is independently hydrogen, alkyl, or aryl or $R^4$ taken together with form a ring,--

Column 7
Line 28, delete "aminoxalylamino" and insert --aminooxalylamino--

Column 13
Line 5, delete "polyoxypropropylene" and insert --polyoxypropylene--

Column 17
Line 4, after "elastomer" insert --.--

Column 20
Line 20, delete "bond a" and insert --bond or a--

Signed and Sealed this
Eighteenth Day of December, 2012

David J. Kappos
*Director of the United States Patent and Trademark Office*

Column 22
Line 11, delete "isindependently" and insert --is independently--